United States Patent [19]

Cattadoris

[11] Patent Number: 5,649,347
[45] Date of Patent: Jul. 22, 1997

[54] APPARATUS FOR USE IN ASSEMBLING A FRAME

[76] Inventor: Joseph M. Cattadoris, 211 Booth St., Utica, N.Y. 13502

[21] Appl. No.: 578,196

[22] Filed: Dec. 29, 1995

[51] Int. Cl.⁶ ................................................ B23P 19/04
[52] U.S. Cl. ................................. 29/252; 29/281.6; 29/281.1; 269/42; 269/43; 269/315; 269/319
[58] Field of Search .......................... 269/42, 43, 303, 269/315, 317, 319, 905, 910; 29/244, 252, 281.3, 505

[56] References Cited

U.S. PATENT DOCUMENTS

| | | | |
|---|---|---|---|
| 744,559 | 11/1903 | Kendrick | 29/252 |
| 2,542,538 | 3/1951 | Kitamura et al. | 29/252 |
| 4,332,203 | 6/1982 | Flowers. | |
| 4,507,836 | 4/1985 | Hiromitsu. | |
| 4,584,756 | 4/1986 | Arnoldt. | |
| 4,870,749 | 10/1989 | Roy et al.. | |
| 5,005,879 | 4/1991 | Jackson. | |
| 5,069,484 | 12/1991 | McElroy. | |
| 5,165,730 | 11/1992 | McElroy. | |
| 5,283,944 | 2/1994 | Goodhue | 29/252 |
| 5,342,100 | 8/1994 | Goodhue. | |
| 5,448,815 | 9/1995 | Kolesar | 29/252 |
| 5,495,652 | 3/1996 | Kitamura et al. | 29/252 |

FOREIGN PATENT DOCUMENTS

| | | | |
|---|---|---|---|
| 332-815-A | 9/1989 | European Pat. Off. | 29/252 |
| 332815 | 9/1989 | Germany | 29/252 |

*Primary Examiner*—Timothy V. Eley
*Assistant Examiner*—Lee Wilson
*Attorney, Agent, or Firm*—Harris Beach & Wilcox, LLP

[57] ABSTRACT

An apparatus is disclosed for assembling a frame, wherein the frame includes slotted side members connected by corner members insertable into slots of the slotted side members. The apparatus includes a table for holding side members of the frame, and a pair of ram assemblies proximate the table and having rams which move toward and from the table. When a ram of a ram assembly is activated a corner bracket received by the ram assembly is inserted into a frame side member carried by the table. The table includes locking mechanisms and guide members. Each locking mechanism and guide member combination orients a frame side member in an aligned position in relation to a ram, and locks a side member so that the side member remains stable when a ram is activated to insert a corner bracket into a side member. The apparatus is particularly useful for assembling a flange frame of an air conditioning or heating duct.

11 Claims, 6 Drawing Sheets

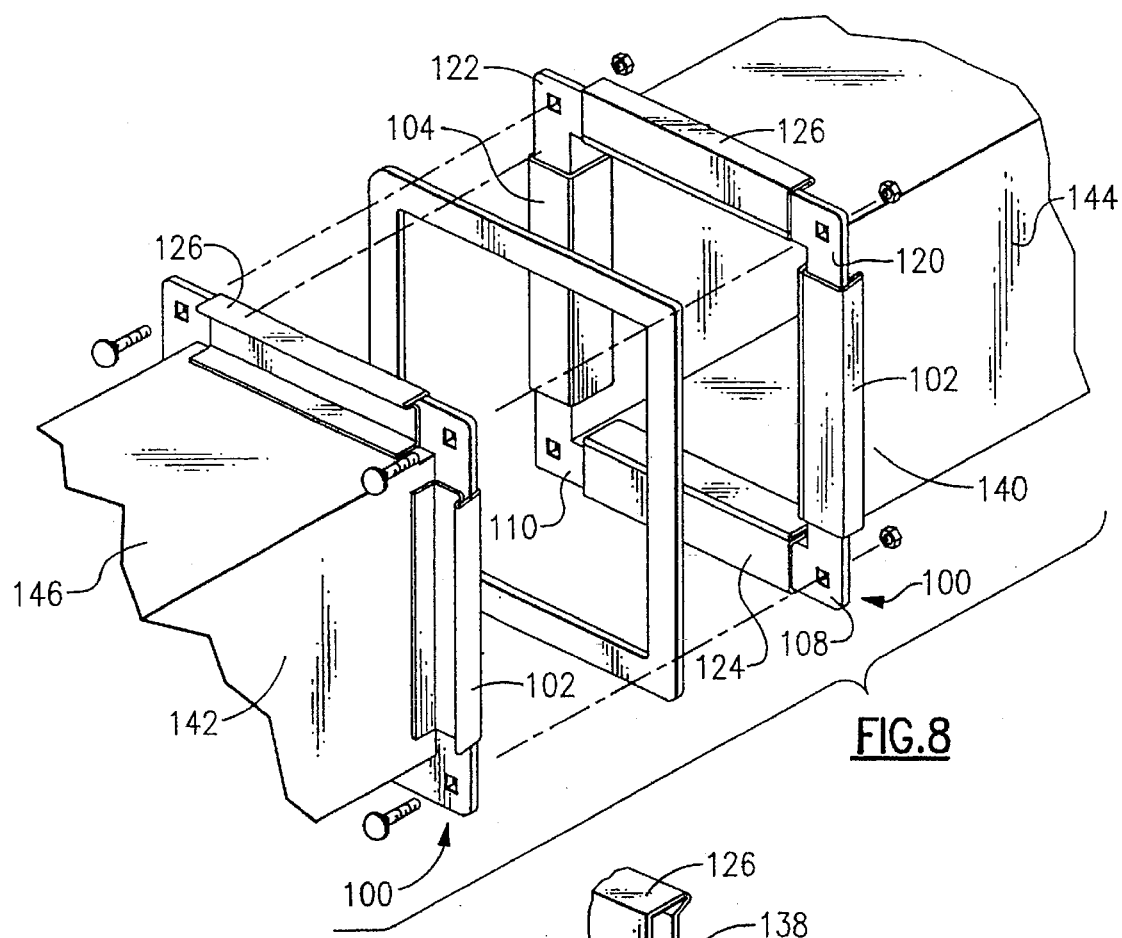
FIG.8
FIG.9
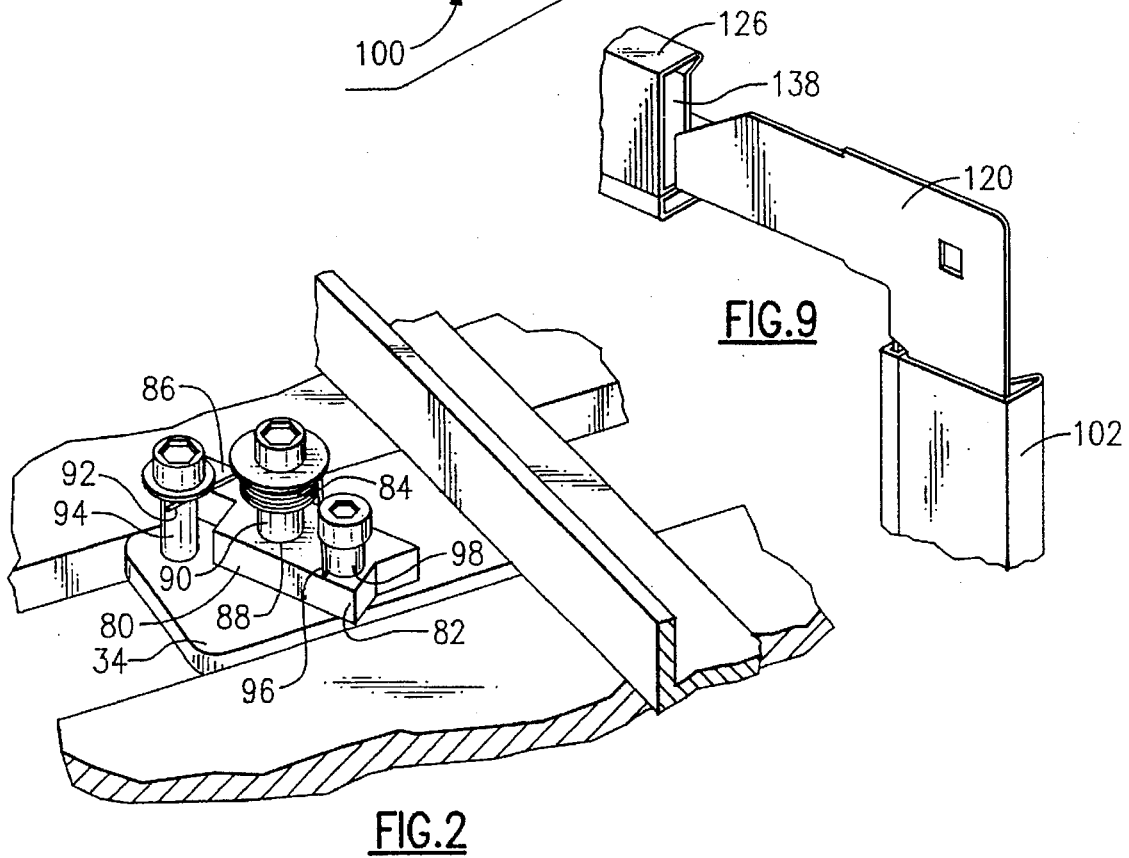
FIG.2

APPARATUS FOR USE IN ASSEMBLING A FRAME

BACKGROUND OF THE INVENTION

1. Field of the Invention

The present invention relates to an apparatus for use in assembling a frame having slotted side members connected by corner brackets. The invention is particularly useful in assembling a flange frame for an air conditioning or heating duct.

2. Background of the Invention

A typical flange frame of a duct for use in air conditioning and heating systems comprises four flat corner brackets that join together four side members. The corner brackets typically have ends that are inserted into slots formed in the ends of the side members.

Duct flange assemblies are difficult to assemble. Various attempts have been made in the prior art to reduce the time and effort required to assemble a duct flange. Most attempts to improve the ease with which duct flanges are assembled have involved improved designs for the corner brackets of the ducts.

For example, U.S. Pat. No. 5,069,484 discloses a corner bracket having pair of locking means formed thereon. When ends of the corner brackets are slid into slots formed into a pair of side members, the locking means engage complementarily formed locking means formed in the edge members. U.S. Pat. No. 5,005,879 discloses corner brackets having folding tabs formed thereon. Ends of the corner bracket are inserted into slots of a pair of side members, and the tabs are folded outward to stabilize the end members in relation to the corner bracket. U.S. Pat. No. 5,165,730, meanwhile, discloses a pair of abutting corner brackets for each corner of a duct flange. When complementary locking means of the abutting brackets engage, the legs of the abutting brackets separate to increase the securing force of the brackets against the side members of the duct.

Despite attempts to improve the design of the corner brackets of a duct flange, problems persist with existing duct flanges. The improved corner brackets proposed in the prior art require specialized locking means, latches, tabs, and the like. Not only are brackets having these miniature and sophisticated components susceptible to breakdown, they are also difficult and costly to manufacture, requiring precise machining.

An apparatus for assembling parts of a duct flange is disclosed in U.S. Pat. No. 5,283,944. The apparatus operates by forcing corner brackets of a duct flange flush against coplaner surfaces of a pair of adjoining side members where they are received by clasps. Like other corner brackets recently proposed, the corner brackets used with the apparatus of U.S. Pat. No. 5,283,944 have sophisticated components and require precision manufacturing.

There remains a need for an apparatus for use in assembling a frame having slotted side members connected by corner brackets, which facilitates quick and effective assembly of parts of the frame, and which does not require for operation specialized or precision manufacturing of the component parts.

SUMMARY OF THE INVENTION

The invention is an apparatus and method for assembling component parts of a frame comprising four slotted side members connected by four corner brackets. The assembly is especially useful for assembling a flange frame for an air conditioning or heating duct.

The apparatus comprises a table and a pair of rams mounted at the front edge of the table, or proximate to the table, which move toward and from the table. Mounted on the table are a plurality of guide members for guiding side members of a frame, and orienting frame side members so that the side members are aligned with a ram.

At least one guide member slides laterally across the table, and at least one ram is slidably mounted proximate to or on the table. The sliding guide member and sliding ram are alignable so that the apparatus can be used to assemble frames of various sizes.

In use, side members of a frame are positioned on the table against the guide members, and corner brackets of the flange are then pushed into slots of the side members using the ram. The component parts of the flange may be assembled using the apparatus by following a specific order of steps. Corner brackets of the flange assembled using the apparatus may be of simple construction, and may be secured to side members of the flange without using fastening flanges, pins, latches or the like.

When a side member of a flange is positioned on the table, the side member should be stabilized in a specific position such that an end of the edge member lies flush with the table's front edge. Preferably, each side member positioned on the table is stabilized using a specially designed locking mechanism mounted on the table. The locking mechanisms of the table allow the sliding of a side member in a first direction (toward the front edge of the table) but resist sliding of a side member away from the table front edge. Thus, each locking mechanism resists the force exerted by a ram when a corner bracket is forced into a slot of a side member.

Each locking mechanism according to the invention includes a block having a knife edge that is spring-loaded such the knife edge is normally biased to contact a loaded side member. When a side member is slided in the direction of loading, the spring compresses to allow free movement of the side member. When the side member is moved in an opposite direction, a tail of the block engages a stopper formed on the locking mechanism so that the knife edge remains engaged with a side member and prevents the movement of the side member.

A major feature of the invention is the table having at least one ram positioned to move toward and from the table. The configuration of the apparatus allows systematic, simplified, and efficient assembly of a frame without specialized construction of the flange components.

Another important feature of the invention is the arrangement of the sliding guide members on the table. The arrangement of guide members allows a flange to be assembled according to a specified and preferred ordering of steps for assembling the flange.

Still another major feature of the invention is the spring loaded locking mechanism comprising a spring loaded block having a knife edge that is normally biased to impinge against a flange side member loaded on the table. The spring loaded locking mechanism allows movement of an edge member in a first direction, but prevents the movement of an edge member in an opposite direction.

Other features of the invention will be apparent to those skilled in the art upon a careful reading of the ensuing Detailed Description of the Preferred Embodiments of the Invention.

BRIEF DESCRIPTION OF THE DRAWINGS

In the drawings,

FIG. 2 is a fragmentary perspective view of an apparatus showing a spring-loaded locking mechanism according to the invention;

FIG. 8 is an installation detail showing the interconnection between two flanged sections of duct in a ductwork system;

FIG. 9 is a fragmentary perspective view of a duct flange frame illustrating the interconnection between a corner bracket and a side member of a duct flange frame.

DETAILED DESCRIPTION OF THE PREFERRED EMBODIMENTS

Figure 1:
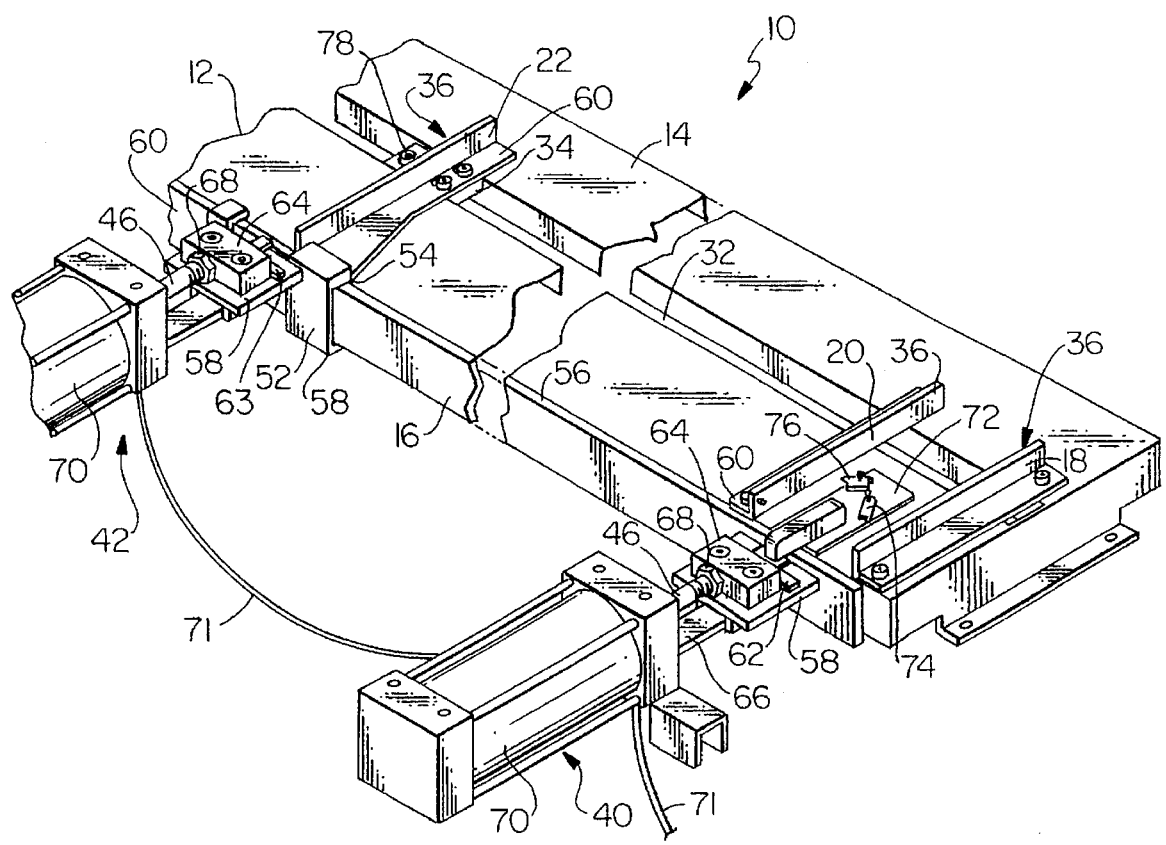
FIG. 1 is a perspective view of an apparatus according to the invention.
Figure 3:
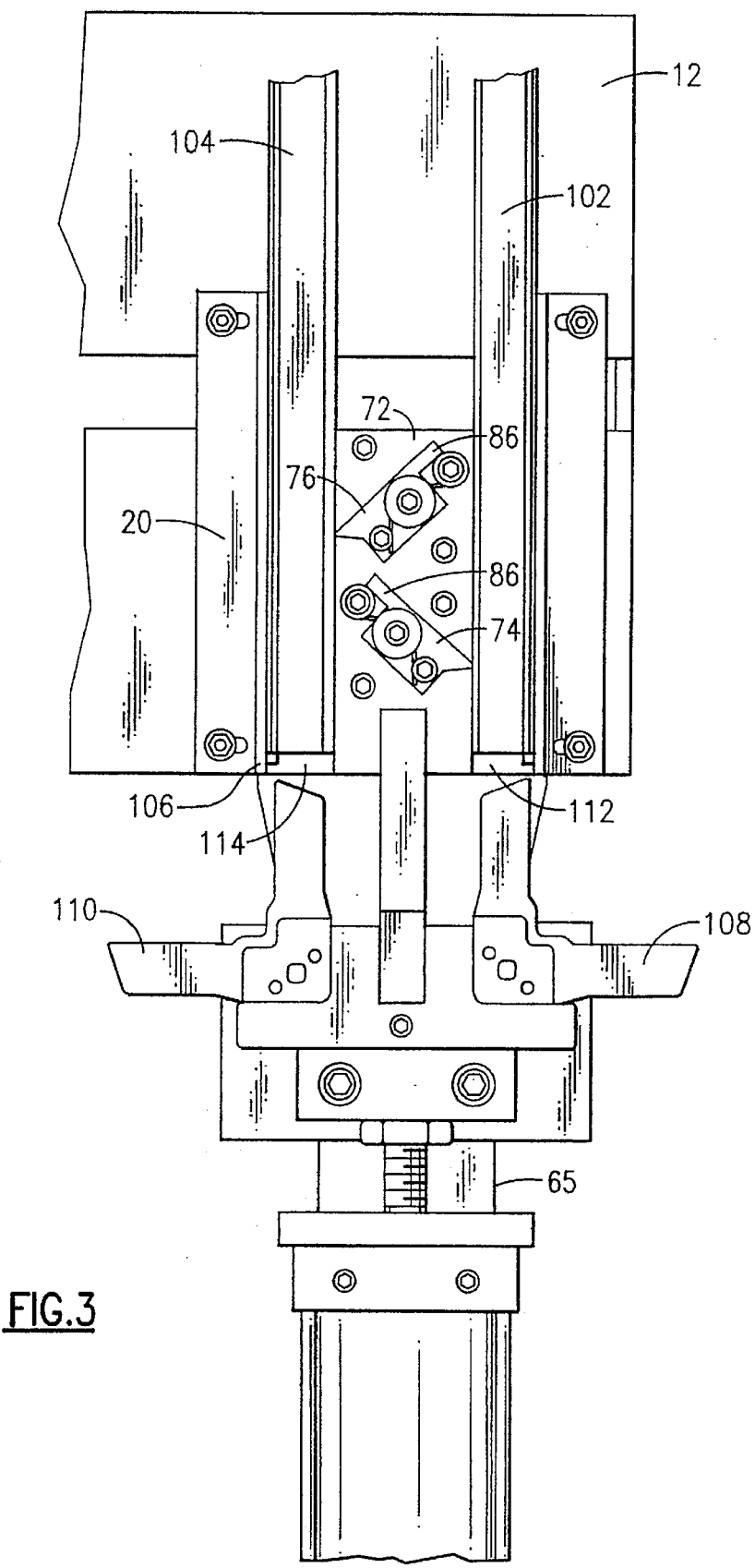
FIG. 3 is a fragmentary top view of an apparatus according to the invention illustrating the loading stage of a preferred first step for assembling a frame.

FIG. 1 shows an apparatus for assembling a frame, wherein the frame includes slotted side members connected by corner brackets. Apparatus 10 includes a table 12 having a top surface 14 and a front edge 16. Top surface 14 has mounted thereon a plurality of guide members 18, 20 and 22 for positioning side members of a duct flange on table 12 generally perpendicular to the table's front edge 14. First and second guide members 18 and 20 may be fixed to table 12 but third guide member 22 should be made to slidably engage lateral slot 32 formed on the table's top surface 14. Third guide member 22 should have attached thereto a guide piece or base 34 formed to engage slot 32 so that third guide member 22 slides in slot 32 laterally across table 12.

A pair of ram assemblies 40 and 42 are mounted to or are proximate to the table such that ram 46 of each assembly opposes and moves to and from table 12 generally perpendicularly to front edge 16. First ram assembly 40 may be fixedly secured to table 12 but second ram assembly 42 should be slidably attached to front edge 16. Second ram assembly 42 may be attached to front edge by way of sliding bracket 52. Sliding bracket 52 includes notch 54 that engages ridge 56 of front edge 16 so that second ram assembly 42 slides laterally across front edge 16. Second ram assembly 42 may be mounted to front edge 16 by sliding first end of bracket laterally onto second end 60 of front edge 16.

Each ram assembly 40 and 42 includes a ram 46 that is oriented to move to and from table 12, preferably in perpendicular relation to front edge 16. Further included on each ram assembly is a substantially flat work platform 58 for carrying duct corner brackets that are to be assembled. Each work platform 58 comprises a flat surface that is coplaner with top surface 16 of table 12. Mounted on each work platform 58 is a corner bracket receiving member 62 for receiving corner brackets of a frame, and a push plate 64. First ram assembly 40 comprises a corner bracket receiving member 62 that receives two corner brackets and second ram assembly 42 comprises a corner bracket receiving member 63 which receives one corner bracket. Each work platform 58 slides generally perpendicularly to and from front edge 16. To accomplish such sliding each work platform may have guide 65 formed on the underside thereof that engages track 66 formed on ram assembly 40 or 42. When ram 46 is actuated to move toward front edge 16 ramming end 68 of ram 46 impinges on push plate 64 to move work platform 58 toward front edge 16 until work platform 58 abuts front edge 16.

Preferably, each ram 46 is powered by a pneumatic cylinder 70 having hose 71 for drawing fluid into and out of cylinder 70. Ram 46 may also be powered by a hydraulic cylinder or by another mechanical apparatus.

First ram assembly 40 further includes a clamping platform 72 for stabilizing and securing side members on table 12 so that they are readily assembled. Clamping platform 72 extends from ram assembly and onto top surface 14 of table 12 where it is attached to table 12 between first and second guide members 18 and 20.

Mounted on clamping platform 72 are a pair of locking mechanisms 74 and 76 for locking side members of a flange in a stable position on table 12 during assembly of a duct flange. When a frame is assembled, a side member of a frame is positioned on table 12 between a guiding edge 36 of a guide member 18 or 20 and clamping platform 72. Positioned as such, locking mechanism 74 prevents rearward movement of a side member away from front edge 16. Locking mechanism 74 applies a force on an edge member that resists the force applied against a side member by ram 46 when a corner bracket is fitted onto a side member.

Figure 7:
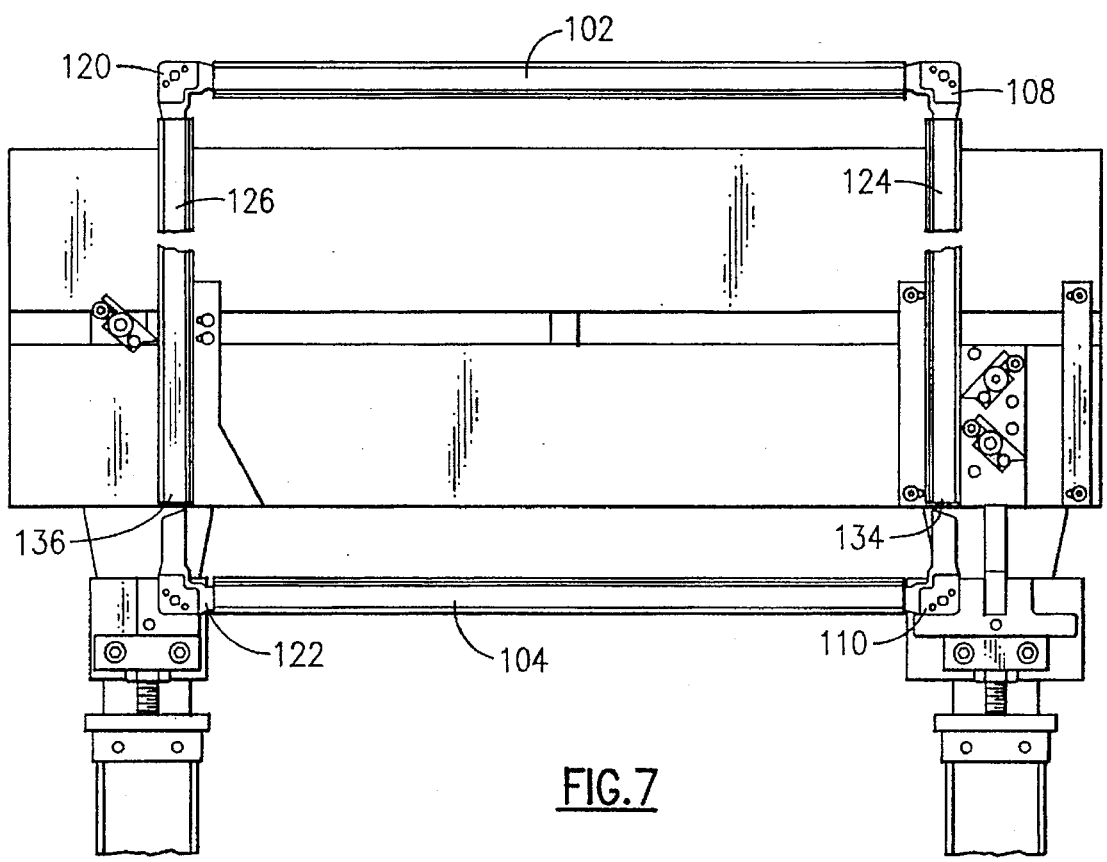
FIG. 7 is a fragmentary top view of an apparatus according to the invention illustrating a preferred fourth step for assembling a frame.

A detailed view of a preferred locking mechanism according to the invention is shown in FIG. 2. Each locking mechanism according to the invention includes a block 80 having an engaging point 82 that is spring-loaded by spring 84 such that engaging point 82 is normally biased to contact a loaded side member, thereby biasing side member 126 against guide member 22. When a side member is slided in the direction of loading, spring 84 compresses to allow free movement of side member. When side member 126 is moved in an opposite direction, a tail 86 formed on block 80 engages a stopper 94 formed on locking mechanism 78 so that engaging point 82 remains engaged with side member 126 to prevent the rearward movement of side member 126, as best seen in FIG. 7.

In a preferred embodiment of locking mechanism 78, block 80 includes hole 88 that is received on center pin 90 of a base, which is shown as provided by guide piece 34 but which in the case of first and second locking mechanisms 74 and 76 is provided by clamping platform 72. Received as such, block 80 pivots on center pin 90. Spring 84 of locking mechanism 78 may also be received by center pin 90. First end 92 of spring 84 may impinge on first pin 94 mounted on base 34 and second end 96 of spring 84 may impinge on second pin 98 mounted on block 80 such that engaging point 82 is normally biased to contact a loaded side member 126. First pin 94 further forms a stopper which engages tail 86 of block 80 so that knife edge 82 prevents the movement of side member 126 against the direction of loading. Engaging point 82 may be formed of resilient material such as rubber, or may be rigid and friction producing. Most preferably, engaging point 82 is formed by a sharp knife edge as shown, of sufficient sharpness to penetrate slightly into the surface of side member 126 and thereby hold side member 126 in a stable position.

Third locking mechanism 78 is mounted on sliding guide piece 34 which carries third guide member.

Now referring to FIGS. 3–7, a preferred method for assembling a frame using the present apparatus will be described in detail, where the frame is a duct flange. In a preferred first step for assembling flange 100, first and second side members 102 and 104 of flange 100 are loaded onto table 12 perpendicular to front edge 16 on either side of clamping platform 72 of first ram assembly 40. Each side member 102 and 104 is loaded onto table 12 to lie flush against guide edge 36 on one side thereof and to abut engaging point 82 of a locking mechanism 72, 74 on another side thereof. When loaded, side member 102 and 104 can be slid perpendicularly on table 12 toward front edge 16 but locking mechanisms 72 and 74 resist the sliding of side members 102 and 104 rearwardly away from the direction of loading. A side member is properly loaded on table when end 106 of a side member lies flush with table front edge 16.

Figure 4:
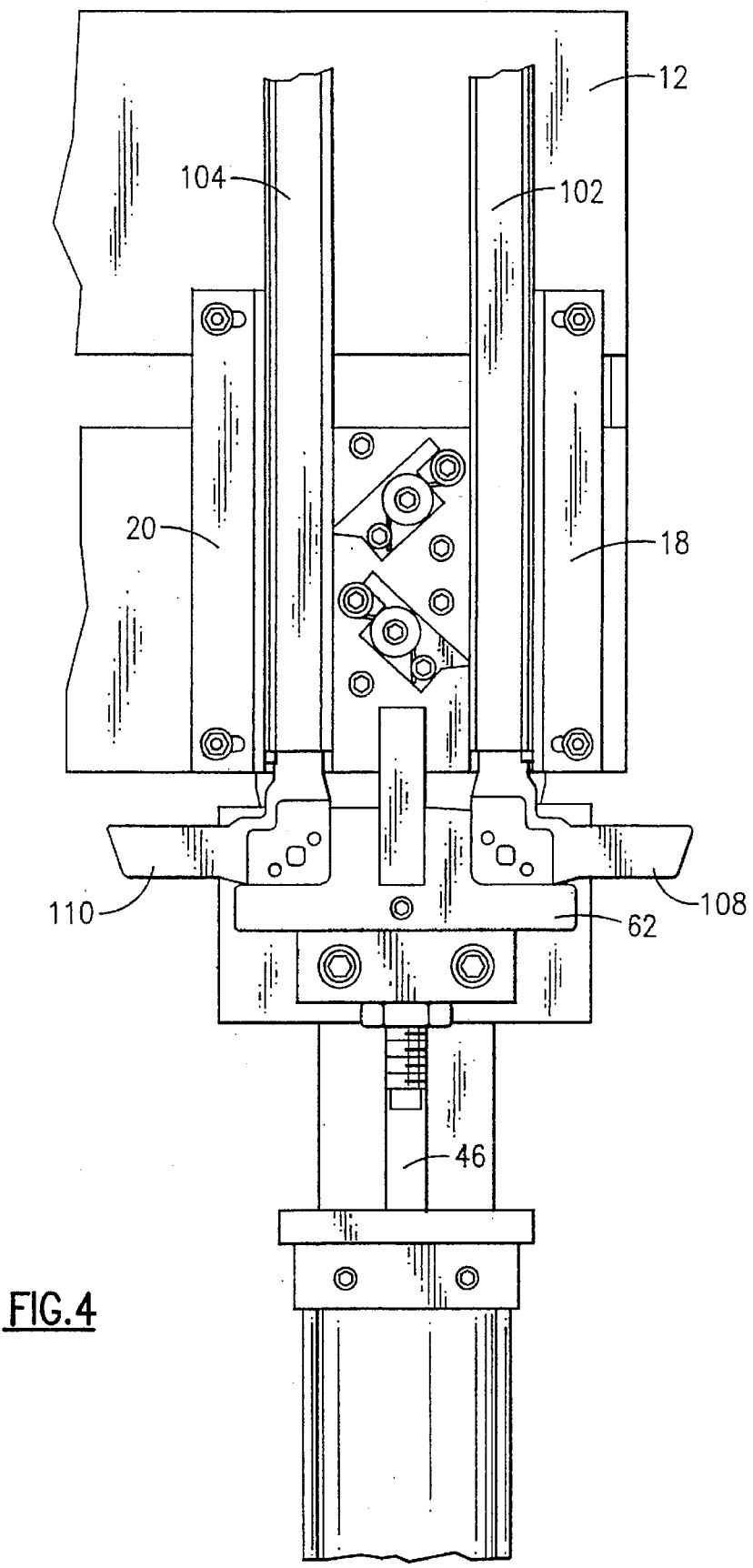
FIG. 4 is a fragmentary top view of an apparatus according to the invention illustrating the insert stage of a preferred first step for assembling a frame.

Also according to a preferred first step for assembling a flange, a pair of corner brackets 108 and 110 are installed on corner bracket receiving member 62 of work platform 58. Activating ram 46 moves ramming end 68 of ram 46 toward front edge 16 of table 12 to press corner brackets 108 and 110 into slots 112 and 114 of first and second side members 102 and 104, as illustrated in FIG. 4.

Figure 5:
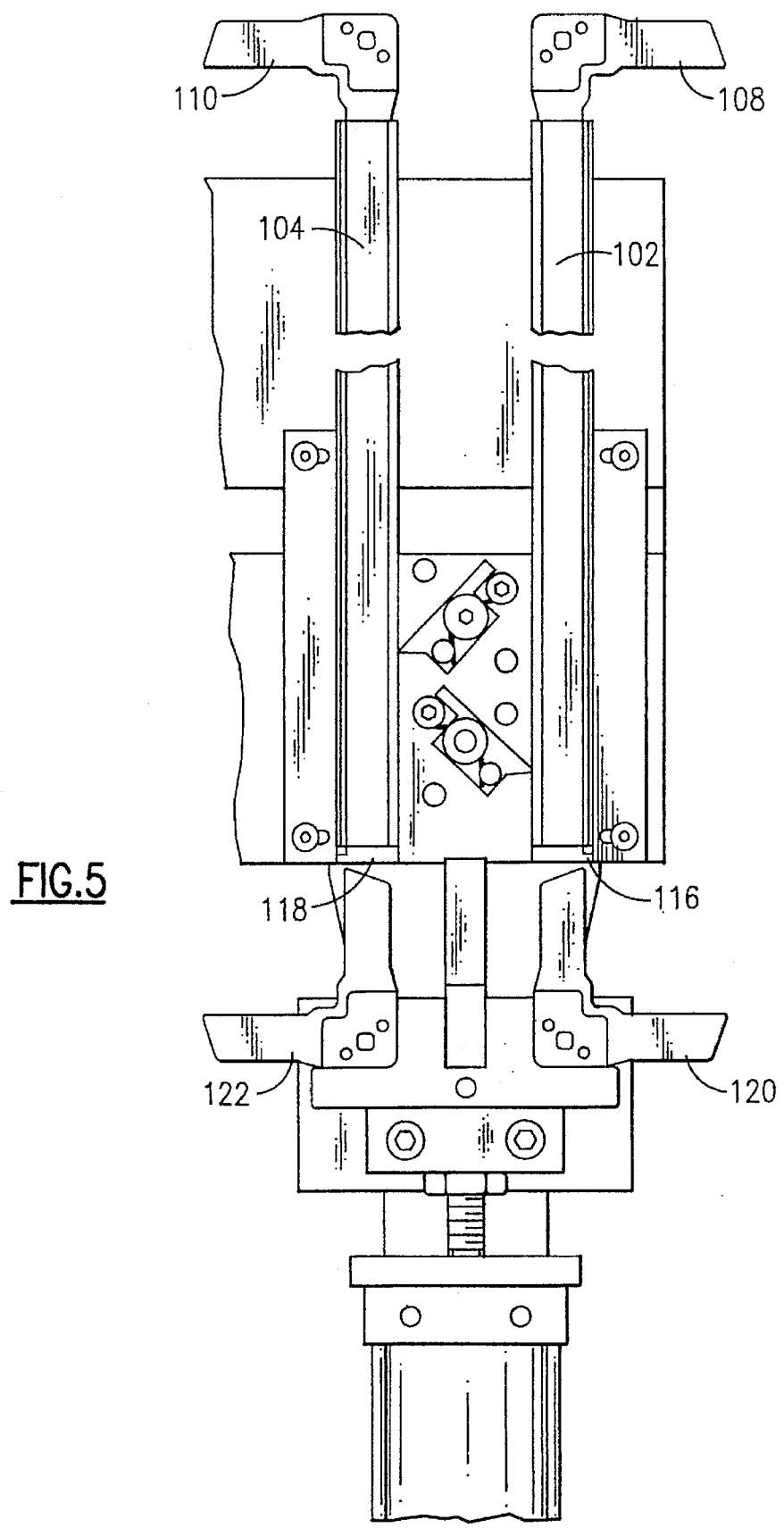
FIG. 5 is a fragmentary top view of an apparatus according to the invention illustrating a preferred second step for assembling a frame.

In a second step in a method for assembling flange 100, first and second side members 102 and 104 of flange are temporarily removed from and then reloaded onto table 12 on either side of clamping platform 72 so that remaining exposed slots 116 and 118 of first and second side members 102 and 104 lie flush with front edge 16, as shown in FIG. 5. Third and fourth corner brackets 120 and 122 are loaded onto corner bracket receiving member 62 and first ram 46 is again activated to press third and fourth corner brackets into exposed slots 116 and 118. At this point in the assembly process first and second side members 102 and 104 each have a pair of corner brackets installed therein.

Figure 6:
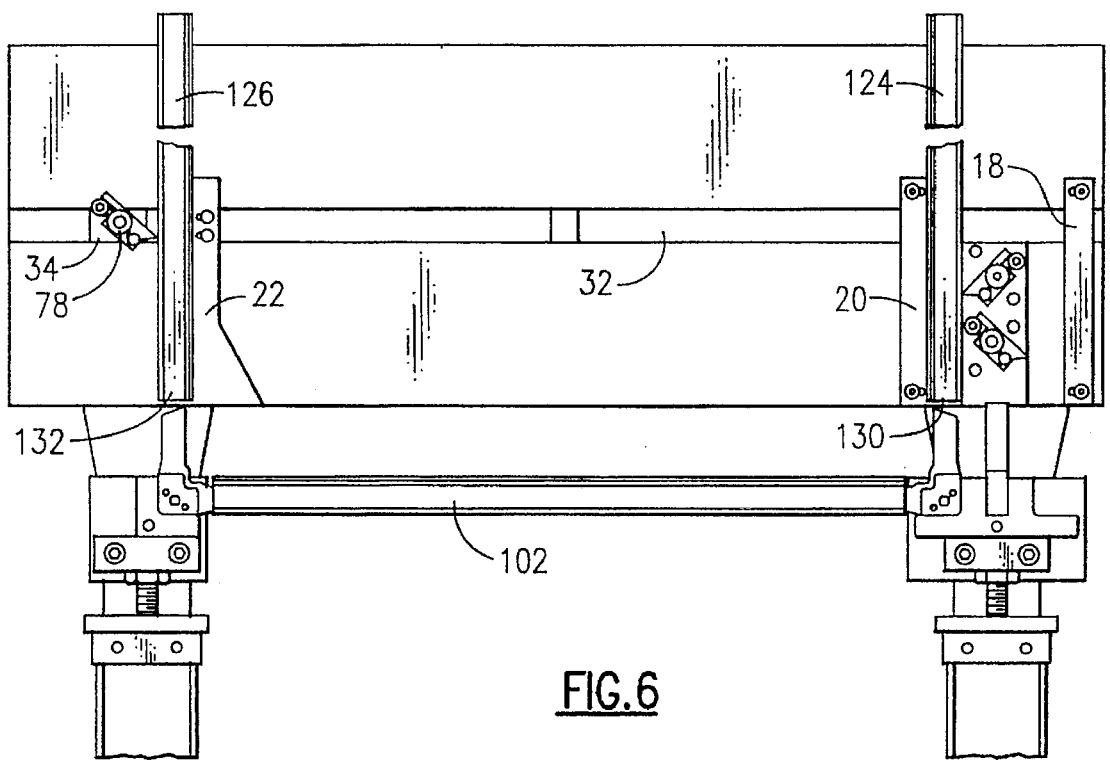
FIG. 6 is a fragmentary top view of an apparatus according to the invention illustrating a preferred third step for assembling a frame.

In a third step for assembling flange, illustrated in FIG. 6, third and fourth side members 124 and 126 are loaded onto table 12. Third side member 124 is abutted against second guide member 20 where it is prevented from sliding rearwardly by second locking mechanism 76 while fourth side member 126 is abutted against third guide member 22 where it is prevented from sliding rearwardly by third locking mechanism 78. It is seen that guide plate 34 carrying third guide member 22 and third locking mechanism 78 is slidable within lateral slot 32 so that table 12 can be used to assemble frames of various sizes.

When third and fourth side members 124 and 126 are loaded onto table 12, first side member 102 having a pair of corner brackets attached thereto is then loaded between work platforms 58 of first and second ram assemblies 40 and 42 such that a corner bracket affixed at either end of first side member 102 is received in a corner bracket receiving member 62 and 63 of each ram assembly. Activating rams 46 of first and second ram assemblies 40 and 42 simultaneously presses corner brackets into slots 130 and 132 of third and fourth side members to secure first side member 102 to third and fourth side members 124 and 126.

The final step in a method for assembling a flange using the disclosed apparatus is illustrated in FIG. 7. Third and fourth side members 124 and 126 are temporarily removed from table 12 and then reloaded so that exposed slots 134 and 136 of third and fourth side members, 124 and 126 lie flush with table front edge 16. Second side member 104 is loaded between first and second ram assemblies 40 and 42, and the rams 46 are activated to attach second side member 104 to third and fourth side members 124 and 126 and to thereby complete assembly of the duct flange.

Details of a frame which can be assembled using the disclosed apparatus are shown in FIGS. 8 and 9. Flange frame 100 comprises four side members 102, 104, 124, 126 having slotted ends such as 138 connected by four corner members which are insertable into the slots of the side members. Flange frames 100 are typically installed at ends 140 and 142 of adjoining sections 144 and 146 of ductwork or at an interface between a section of ductwork and an equipment article (not shown). Referring specifically to FIG. 9, it is seen that corner bracket 120 is connected to slot 130 simply by inserting corner bracket into slot 130 without use of fasteners, latches, pins, etc. Skilled artisans will recognize that the principles disclosed in describing the present invention can be applied in making a frame assembly apparatus wherever assembling a frame requires inserting a corner bracket into a slotted side member.

While this invention has been explained with reference to the structures disclosed herein, it is not confined to details set forth and this application is intended to cover any modification and changes as may come within the scope of the ensuing claims.

What is claimed is:

1. An apparatus for assembling a frame, said frame having a plurality of side members and a plurality of corner brackets, said apparatus comprising:

a table having a top surface;

a pair of spaced apart ram assemblies, each assembly having a ram, said each ram assembly having ram moving means for moving its associated ram between a forward and retracted position, said each ram assembly having receiving means for receiving a corner bracket; and a pair of guide members formed on said top surface for orienting a pair of said side members in a predetermined orientation on said table, said guide members being aligned or alignable with said rams;

said ram assemblies and said guide members being arranged so that a pair of corner brackets received in said receiving means are simultaneously inserted into a pair of side members received against said guide members when said ram assemblies are aligned with said guide members and when said ram assemblies are actuated simultaneously.

2. The apparatus of claim 1, further comprising:

holding means formed on said table for holding said side member so that said side member remains in a stable position when said ram is actuated.

3. The apparatus of claim 1, further comprising:

means formed on said table for biasing a side member carried by said table against one of said guide members; and holding means formed on said table for holding said side member so that said side member remains in a stable position when a ram aligned with said one of said guide members is actuated.

4. The apparatus of claim 1, wherein said at least one ram assembly includes ram adjustment means for adjusting the alignment of said at least one ram assembly with respect to one of said guide members, said adjustment means enabling a distance between said ram assemblies to be adjusted.

5. The apparatus of claim 1, further comprising, guide member adjustment means associated with at least one of said guide members for adjusting the position of said at least one guide member on said table so that said at least one guide member can be aligned with one of said ram assemblies and further so that a distance between said pair of guide members can be adjusted.

6. An apparatus for assembling a frame, said frame having a plurality of side members and a plurality of corner brackets, said apparatus comprising:

a table having a top surface;

at least one guide member formed on said top surface for orienting a pair of side members in a predetermined orientation on said table;

a ram assembly aligned or alignable with said at least one guide member, said ram assembly having a ram and ram moving means for moving said ram between a forward and retracted position;

a pair of receiving means formed on said ram assembly, said each receiving means adapted to receive a corner bracket so that a pair of corner brackets received in said receiving means are inserted into a pair of side members received against said at least one guide member when said ramming means is actuated.

7. An apparatus for assembling a frame, said frame having at least one side members and one corner bracket, said apparatus comprising:

a table having a top surface;

a guide member formed on said top surface for orienting a side members in a predetermined orientation on said table;

a ram assembly aligned or alignable with said guide member, said ram assembly having a ram and ram moving means for moving said ram between a forward and retracted position;

receiving means formed on said ram assembly for receiving a corner bracket so that said corner bracket received in said receiving means is inserted into a side member received against said guide member when said ramming means is actuated; and a locking mechanism formed on said table for allowing one-way movement of a side member against said guide member, said locking mechanism allowing sliding of a side member against said guide member in a first direction toward said ram assembly, and preventing sliding of said side member against said guide member in a second direction opposite said first direction.

8. A locking mechanism for allowing one-way sliding of a workpiece in a first, loading direction against a guide member formed on a substantially flat surface, said locking mechanism comprising:

a block having a first end and a second end, said first end having an engaging point for engaging said workpiece;

a pivot point formed on said surface for pivotally receiving said second end of said block, said block having a first pivoting direction and a second pivoting direction;

spring means pivotally biasing said engaging point about said pivot point in said first pivoting direction against said workpiece, said engaging point angled toward said first direction when engaging said workpiece so that said spring means compresses to allow free movement of said workpiece when said workpiece is moved in said first direction;

a stopper formed on said surface;

a tail formed at said second end of said block, said tail engaging said stopper when said block is pivoted in said second pivoting direction, whereby said tail engages said stopper to stop movement of said workpiece when said workpiece is urged in a direction opposite said first direction.

9. The locking mechanism of claim 8, wherein said engaging point is a knife edge.

10. A locking mechanism for allowing one-way sliding of a workpiece in a first, loading direction on a surface, said workpiece abutted against a guide member formed on said surface, said locking mechanism comprising:

a block having a first end and a second end, said first end having an engaging point for engaging said workpiece, said block further having a hole formed at said second end;

a pivot pin for pivotally receiving said hole of said block, said block having a first pivoting direction and a second pivoting direction;

a stopper pin formed on said surface;

a block pin formed at said first end of said block;

a spring received on said center pin, said spring having a first end impinging on said stopper pin, and a second end impinging of said block pin so that said spring pivotally biases said engaging point about said pivot point and against said workpiece, said engaging point angled toward said first direction when engaging said workpiece so that said spring means compresses to allow free movement of said workpiece when said workpiece is moved in said first direction;

a tail formed at said second of said block, said tail engaging said stopper pin when said block is pivoted in said second pivoting direction, whereby said tail engages said stopper to stop movement of said workpiece when said workpiece is urged in a direction opposite said first direction.

11. The locking mechanism of claim 10, wherein said engaging point is a knife edge.

* * * * *